(12) United States Patent
Gravdal

(10) Patent No.: US 7,052,601 B2
(45) Date of Patent: May 30, 2006

(54) PROCESS AND MEANS FOR THE TREATMENT OF WATER IN AN AQUACULTURE SYSTEM

(75) Inventor: Arve Gravdal, Rognaldsvåg (NO)

(73) Assignee: ECO Farm AS, Rognaldsvag (NO)

(*) Notice: Subject to any disclaimer, the term of this patent is extended or adjusted under 35 U.S.C. 154(b) by 158 days.

(21) Appl. No.: 10/491,593

(22) PCT Filed: Oct. 3, 2002

(86) PCT No.: PCT/NO02/00361

§ 371 (c)(1),
(2), (4) Date: Jun. 4, 2004

(87) PCT Pub. No.: WO03/034817

PCT Pub. Date: May 1, 2003

(65) Prior Publication Data

US 2004/0256301 A1    Dec. 23, 2004

(30) Foreign Application Priority Data

Oct. 3, 2001  (NO) .................................. 20014797

(51) Int. Cl.
*A01K 63/04* (2006.01)
*A01K 61/00* (2006.01)
*C02F 1/32* (2006.01)
*C02F 1/78* (2006.01)
*C02F 3/00* (2006.01)

(52) U.S. Cl. ....................... 210/167; 210/150; 210/206; 210/221.2; 210/260; 210/748; 210/760; 119/227

(58) Field of Classification Search ................ 210/150, 210/151, 167, 169, 198.1, 205, 206, 221.1, 210/221.2, 260, 748, 760; 119/226, 227
See application file for complete search history.

(56) References Cited

U.S. PATENT DOCUMENTS

| | | | | |
|---|---|---|---|---|
| 3,804,063 A | * | 4/1974 | Finger | .................... 119/226 |
| 4,052,960 A | | 10/1977 | Birkbeck et al. | |
| 4,211,183 A | * | 7/1980 | Hoult | ..................... 119/227 |
| 4,915,828 A | | 4/1990 | Meyers et al. | |
| 4,972,801 A | * | 11/1990 | Hunt | ..................... 119/215 |
| 5,054,422 A | * | 10/1991 | Nojima et al. | ............. 119/215 |

(Continued)

FOREIGN PATENT DOCUMENTS

EP    0 484 896    5/1992

(Continued)

OTHER PUBLICATIONS

Oppdrettsteknologi, Tapi forlag 1992, pp. 542-546. (In English: Fish Farming) Technology.

(Continued)

*Primary Examiner*—Fred G. Prince
(74) *Attorney, Agent, or Firm*—Reed Smith, LLP

(57) ABSTRACT

A process and a means are described for treatment of water that forms a growth environment for marine organisms, where this water is in a main tank that is placed on land. The invention provides a sufficient treatment/cleaning of the water so that it can be continuously re-circulated, and thus form a closed loop where one is not dependent on supply of external water.

23 Claims, 3 Drawing Sheets

U.S. PATENT DOCUMENTS

| | | | |
|---|---|---|---|
| 5,397,463 A | 3/1995 | Woltmann | |
| 5,667,671 A | 9/1997 | Munsch et al. | |
| 5,746,921 A | 5/1998 | Gargas et al. | |
| 5,961,831 A | 10/1999 | Lee et al. | |
| 2005/0061737 A1* | 3/2005 | Linden et al. | 210/602 |

FOREIGN PATENT DOCUMENTS

| | | |
|---|---|---|
| EP | 0 489 397 | 8/1992 |
| NO | 172487 | 6/1991 |
| NO | 179961 | 12/1994 |
| WO | WO88/09615 | 12/1988 |
| WO | WO97/49279 | 6/1997 |

OTHER PUBLICATIONS

International Search Report for PCT Patent Application No. PCT/NO02/00361.

* cited by examiner

PROCESS AND MEANS FOR THE TREATMENT OF WATER IN AN AQUACULTURE SYSTEM

The present invention relates to a means and a process for treatment of water which is used in a land based farming installation. The means for water treatment is integrated in the farming tank itself.

Thus, the invention relates to a process for treatment of a body of water, which forms a growth environment for marine organisms, especially fish. The water is in a main tank on land, and the process comprises stages for biological, chemical and physical treatment of the water. Thus, a part of the water body in the water reservoir is continuously circulating through the different cleaning stages, and it is only necessary with a negligible addition to/change of the water.

The invention also relates to means for carrying out the process.

For a long time, attempts have been made to move farming installations for fish from the sea/water to make these installations land based. By moving the installations to large tanks on land, one will establish an isolated environment and obtain much better control of the problems, such as diseases which are which are brought on to the installation by way of infection carriers external to the installation, and the isolated environment one can create on land will also give a much better control of the use and effects of medication, for example, one will be able to prevent discharges of antibiotics.

The attempts that have been carried out previously with land based installations have not worked, and there are two reasons for this, namely that the production becomes too costly, and where attempts have been made to re-circulate the processing water, one has encountered problems with providing sufficient cleaning of the water, as it will be decisive for the establishment of an isolated environment that the water is re-circulated. Furthermore, one has tried to re-circulate water in integrated tank systems. This is an important development because such a system is very cost saving both with regard to operating costs and investment costs. However, the solutions that have been presented up to now have not been able to solve the problems of too high $CO_2$ concentration in the water in a satisfactory way.

Solutions for land based farming installations in which the water is removed and led out of the tanks by way of pipe systems to external water treatment installations, are known within the state of the technology. The water is cleaned/treated and led back to the tank.

In the remaining part of the description, we will use the term "water treatment" as this is meant to encompass what is conventionally denoted as water cleaning, but also further treatment steps such as influencing the water's concentration of dissolved oxygen and carbon dioxide.

The treatment stages can be biological, chemical and physical so that the marine organisms, hereafter called the fishes, get an optimum growth environment. The main thing is that cleaning of the water takes place to remove or neutralise substances that are added to the water from the fish themselves, such as excrement, or from organisms that are added during the treatment, etc. In water treatment, one also wishes to remove and counteract the growth of disease generating viruses, bacteria, fungi, etc.

In more detail, in the biological stage use is made of bacteria that can convert ammonia to nitrate by way of nitrite, with the ammonia as well as the nitrite being harmful to fish. Furthermore, bacteria can be used to heal, or counteract, for example, fungi infections, which the fish may get, especially on the gills.

Chemical treatment stages can comprise an addition of, for example, a pH buffer, i.e. a substance that gives the water a certain pH value, in other words a change of its acidity to an optimal value for the fish and the micro-organisms, as, for example, bacteria produce acid in the conversion of ammonia and nitrite to nitrate.

In physical cleaning stages, oxygen can be added to the water, $CO_2$ can be removed or reduced and particles can be removed. Furthermore, a disinfection of the water can possibly be carried out.

Oxygen is added so that the fish can be supplied with a sufficient amount of oxygen to the blood by way of the gills, but bacteria are also dependent on oxygen. $CO_2$ is removed because it is toxic to the fish, and particles are removed as a part of a general cleaning of the water of dirt and pollutants.

The disinfection is used to kill not only disease generating organisms, but also organisms that have a function during the water treatment, as it has shown to be necessary to control the concentration of all these organisms because too high concentration can be harmful to the fish.

However, the known process that comprises use of means outside the main tank is complicated, as it comprises long pipes and many parts such as pumps, valves, one-way valves etc, to control the flow of water through the pipes.

Thus, the means are space demanding, complicated and costly, something which leads to the risk of failure being great and the need for maintenance being extensive. Therefore, such known land based installations will not be able to compete with conventional installations at sea or in water.

Thus, it is an aim of the present invention to provide an installation that can compete with traditional installations in terms of costs. As the installation can be placed on land, the production can also take place anywhere, for example, where the markets are. Because of the low production costs, the production can take place in smaller installation units, and they can also be placed in countries where one does not have a traditional farming industry today, for example in underdeveloped countries.

As mentioned, the water in the known installations is removed from the water tank (the farming tank), and it has been shown that this represents a considerable risk with respect to the cleaning parameters becoming unstable as a function of time. One reason for this is that the temperature of the water, in the pipes and in the containers where the cleaning processes are carried out, can deviate from the temperature of the water in the tank. Furthermore, pollutants can congregate in the many turns and corners of the installations, and such pollutants can be liberated intermittently or gradually and be carried by the water stream due to sudden changes in the water speed in the pipes and the above-mentioned parts.

It is also known within the prior art that attempts have been made to produce a water cleaning means with parts that are arranged inside the main tank, i.e. a means where the water is not removed from the container, but this means comprises neither devices for disinfection of the water nor installations for breaking down of organic material (ozone). Indeed, it comprises installations for a certain reduction of $CO_2$ and particles, but these installations have not functioned satisfactorily, and the attempts with this water cleaning means were abandoned as it was considered that a cleaning means arranged on the outside of the tank could function more satisfactorily. The known means also comprised a device for removing particles, but this did not function satisfactorily. Thus, the attempts that have been made up to now to integrate the cleaning installation in the water tank itself have failed, or at least not functioned satisfactorily. However, this shows clearly that within the industry, one has a wish to provide such land based installations, but that one has, up to now, not managed to solve the technical problems. This means that one has not managed to obtain sufficient cleaning/treatment of the water in such a simple and cheap way that the installations can compete with conventional sea-based installations.

Examples of such installations can be found in those publications that were held against the Norwegian priority application NO 2001 4797. It is especially mentioned that in these installations it is not possible to obtain sufficient removal of $CO_2$ in such compact installations. It has been shown that to remove sufficient $CO_2$ one must supply about 4–5 times more volume of air than the volume water that the fish need. Today, it is generally accepted that this cannot be achieved in practice in combination with a air lift which is integrated in the tank such as used in the above-mentioned publications.

The present invention has been shown to function well in practice and is the first realisation of a land-based installation with an integrated cleaning system which functions satisfactorily.

So-called poly-culture systems are also known within the prior art. Such extensive farming systems are known from China, and in these installations, the cleaning is carried out without removing the water from the main tank. Such installations comprise several cultures or organisms, and the disadvantage with this type of farming is that one cannot optimise and make them efficient for each individual type of organism.

However, such installations also show that there is an expressed wish to establish land-based installations.

Thus, a further aim of the present invention is to establish a water treatment process and means for such water treatment in which one can simply optimise for different types of organisms. This implies that one simply can optimise the different cleaning and treatment stages that are part of the process.

As will be apparent from the detailed description below, the present invention provides a solution such that the aims of the invention as described above can be fulfilled. The essential concept that lies as a basis for the invention is that the different treatment stages, and thus the different treatment systems, are integrated as a part of the main tank. Thus one avoids the problems that are associated with the installations within the prior art, and one provides an installation in which the water can be cleaned/treated in the water tank itself. Furthermore, one reduces the concentration of $CO_2$ to a level that is acceptable for the health and welfare of the fish. The unit for removing/stripping of $CO_2$ that is shown in 2001 4797 is a separate unit which takes up considerable volume and area. To achieve a satisfactory solution this volume is place above the water in the present invention, something that is of decisive importance so that it does not influence the hydraulic characteristics in the tank or take up too large a part of the tank volume.

The calculation and models that have been carried out show that, in this way, one can obtain a production of seafood where the production costs are similar to, or also much smaller than, those of conventional sea-based installations. As one, in this way, obtains a compact installation where the environment in the installation can be controlled in great detail, one obtains an installation that is very flexible, both with regard to geographic location, the species one wishes to farm and also with regard to the size of the installation.

Thus, a process and means are provided which will be described in more detail below, which is not burdened with the disadvantages that characterise today's land-based installations.

Thus, the means according to the invention comprises a light and compact unit, as there is no need for a large system of pipes. Therefore, the means is reliable in operation, simple to maintain, cheap, demands little space and is simple to fit in a main tank. The means can therefore be used by personnel who only need to be given a short and simple introduction related to its use and operation. Thus, it is especially suited to application in countries where there is a shortage of personnel with advanced knowledge.

The characteristics of the means according to the invention are apparent from the characteristic features given in the claims.

The invention will be explained further with reference to the drawings, which schematically show a representative embodiment of a means according to the invention in which arrows are given to show the flow of the water through the different treatment units.

Figure 1:
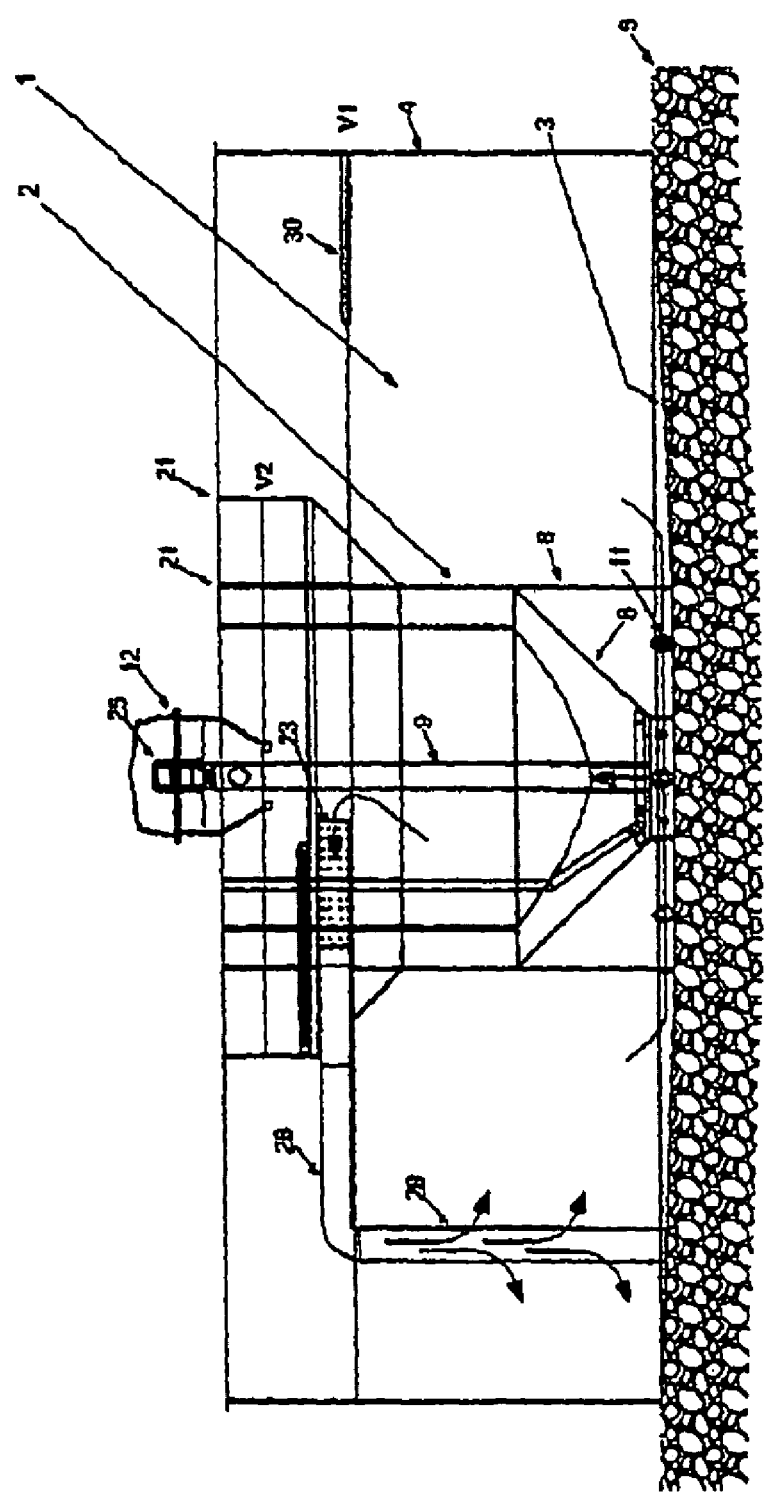
FIG. 1 is a perspective outline of an embodiment of a land-based farming installation. A water treatment unit according to the invention is arranged in the main tank.
Figure 2:
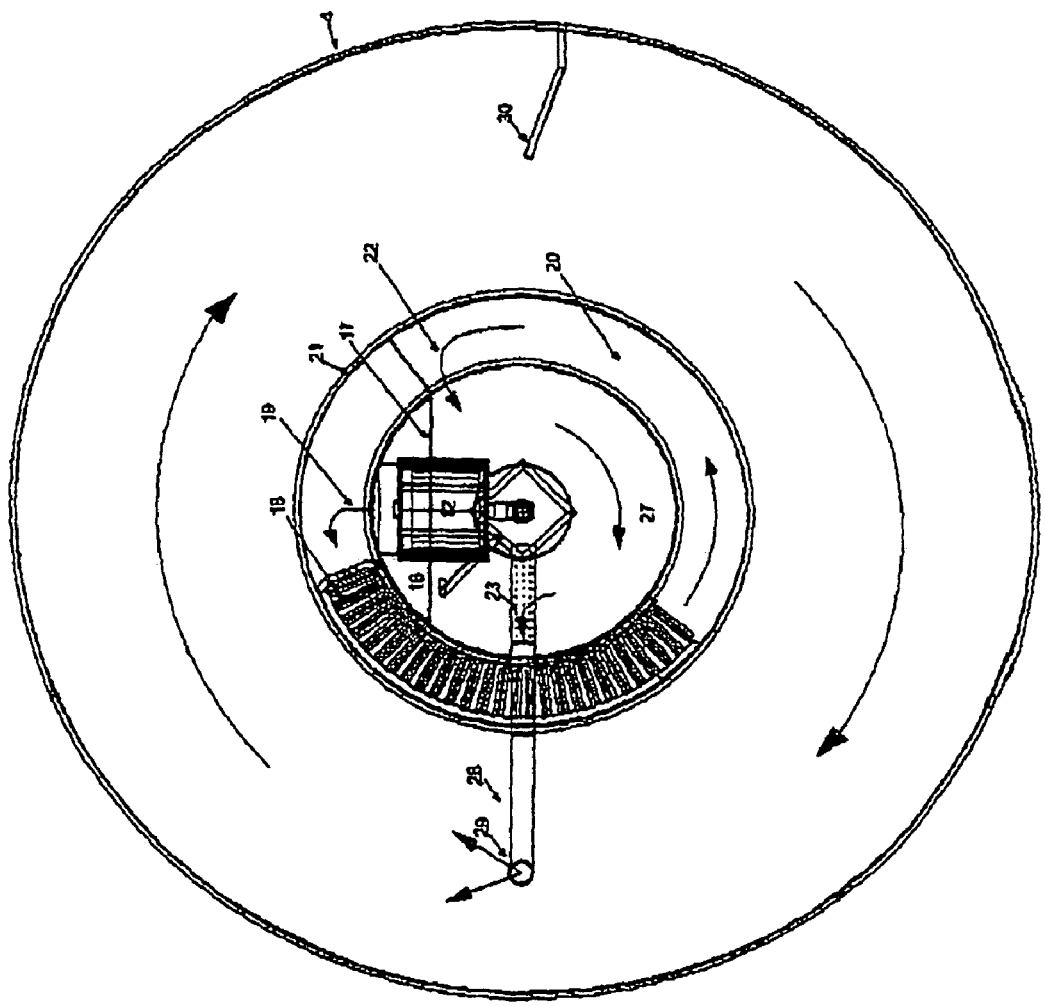
FIG. 2 is a perspective outline, which shows the water treatment unit according to FIG. 1 from a different angle.
Figure 3:
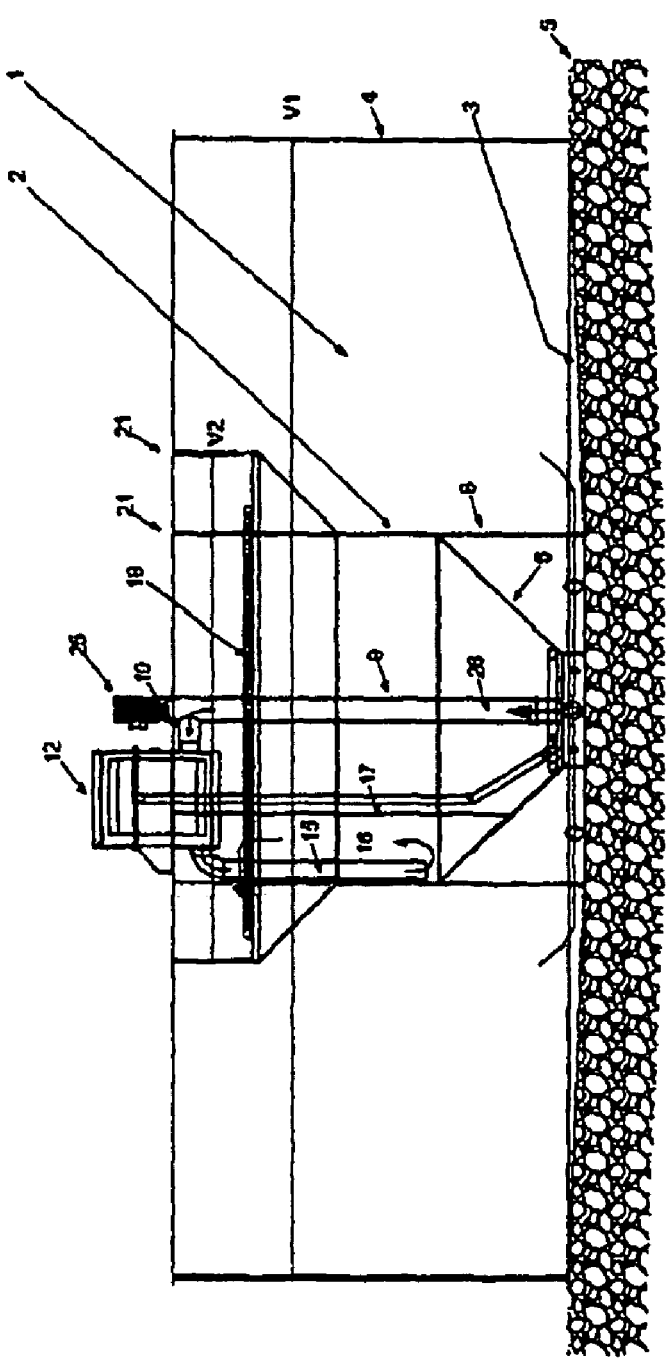
FIG. 3 is a drawing of the water treatment unit seen from above.

FIG. 1 shows a water tank 1 which can be used for farming of, among other things, fish. As fish is the type of organism that is being farmed most extensively, the description given below will be given with reference to fish farming, and the description of the different treatment stages will be directed toward steps that are necessary to establish a good environment for fish. In Norway, one has the most extensive knowledge within fish farming related to fish like salmon and trout, but it must be pointed out that the process and means according to the invention can be optimised and used for any type of fish. Furthermore, the installation can simply be used for other species such as crustaceans as well as shellfish, such as oysters etc.

As can be seen in FIG. 1, the fish farm installation comprises a main tank 1 that stands on land. A farm installation can comprise several such tanks 1, and the tanks 1 can furthermore be given an arbitrary size, adapted to the actual production. The main tank 1 rests on the ground 5, possibly by way of a foundation (not shown). The tank is filled with water (seawater or fresh water), containing different marine species, for simplicity hereafter denoted as fish.

As mentioned above, the central element of the invention is that a water treatment unit 2 for cleaning/treating of water is placed in this water tank 1. Thus the water treatment is carried out in a compact unit 2, which is integrated in the water tank 1 itself, i.e. without the water in the main tank 1 being led out of the tank for external treatment.

In the embodiment of the farm installation that is shown in FIG. 1, the main tank 1 has a circular bottom 3, and a corresponding circular wall 4 extends up from the circumference section of the bottom 3. The main tank 1 is equipped with its own appliances (not shown) whereby it can be filled with water of the type that the farmed fish thrives in, and appliances (not shown) whereby the tank 1 can be emptied for cleaning, possibly changing part of the water.

The treatment unit 2 is arranged as explained integrated in the main tank 1 itself. It is preferably arranged in the middle of the tank 1, but this is no premise. Furthermore, this treatment unit is compact, and in a preferred embodiment it is prefabricated for thereafter to be placed in the tank 1. The treatment unit 2 is preferably placed on the bottom 3 of the tank 1.

To obtain access for people who shall be responsible for the running of the installation, it is preferential to have a stairway/walkway (not shown in the figures) running from the ground outside the main tank 1 to the upper section of the treatment unit 2.

In principle, the treatment unit 2 is a container. A currently preferred form of the container is cylindrical, with a lower, downwardly pointed conical section 6. In the preferred embodiment of the treatment unit 2, walls 8 that rest on the bottom 3 of the main tank, run on the outside of the conical section 6.

When the installation is in operation, the water surface in the main tank 1 is at the level that is given by V1 and the water surface in the container 2 is at the level that is given by V2.

Water from the main tank 1 is fed to the treatment unit 2 by way of a pipe 9 that is placed in the treatment unit 2 itself, and which is led through the bottom section of the treatment unit 2. Thus water is collected from the bottom of the main tank 1 and water is fed with the help of a pump unit by way of the tube 9 to the water surface V2 in the water treatment tank 2. The upper section of pipe 9 is joined to a pipe connector 10. In connection with pipe 9, a specially adapted pump is fitted, the motor 25 of which can be joined to a propeller unit 26 (not shown in the figure) inside (submerged pump) or above (dry sump pump) pipe 9.

The first treatment stage that is carried out in the treatment unit 2 is mechanical filtration. Water is led by way of the pipe connector 10 to a mechanical filter unit 12. Preferably, a filter adapted for removing particles is used in this filter unit 12. In connection with farming of salmon, it has been found that it is preferential to use filters in the filter unit 12 that do not let through particles with a diameter larger than 90 µm. Particles that are too large to go through the filter can be led out of the filter unit 12 by way of a separate pipe (not shown).

The next treatment stage that is carried out in the treatment unit according to the invention is a disinfection. This disinfection occurs, for example, with the aid of ozone gas or UV radiation. The disinfection takes place in a chamber which is bound by a first section of the wall and bottom of the container 2 and a vertical dividing wall 17. This chamber can preferably take up 10 to 20 percent of the total volume of the treatment unit.

The dividing wall 17 bounds, with the remaining section of the container 2, a second chamber 27. The water is led into the aeration chamber 20 where the water is stripped for $CO_2$ by an aeration system 18. Such an aeration chamber can have any shape, but in the embodiment that is shown in the figures, this aeration chamber 20 has been given a circular shape, and this is bound by a chamber that is lying almost externally in relation to the treatment unit 2 itself. However, installations have also been constructed in which this aeration chamber extends from the water treatment unit in a radially outwardly extending section towards the outer circumference of the tank 1. Preferably, this aeration chamber ought to be able to take up an amount of water of about 25 percent of the water mass of the treatment unit, and the surface area should make up at least 50 percent of the surface area of the treatment unit. Furthermore, the aeration chamber 20 is bound by a set of vertical dividing walls 21 that bound inlet 19 and a horizontal outlet 22 of the aeration chamber 20. It has been found advantageous to use diffusers 18 to establish a more effective aeration, and in a preferred embodiment diffusers and associated pipe connections are thus arranged at about half the circumference of the circular aeration chamber 20.

The next treatment stage is a biological treatment of the water, and this treatment is carried out in chamber 27. The treatment itself is described in more detail below.

The water is thereafter led by way of a horizontal pipe 28 to a vertical pipe 29. Oxygen is added in the supply pipe 29 in an unspecified way. In the vertical pipe 29, a series of openings are arranged for communication with the chamber in the main tank 1.

The process for treatment of the water in the main tank will be described in more detail below.

Contaminated water in the main tank 1 is sucked in an unspecified way, with the aid of a pump 25 or propeller 26, into the central pipe 9 by way of the sieve 11, that prevents the fish from being drawn into the cleaning unit 2. Thereafter, the water flows into the filter unit 12 in which it is filtered for particles that are smaller than for example, 90 µm.

Thereafter, the water flows through the disinfection chamber 16 where ozone gas ($O_3$) is taken up, or it is radiated with ultraviolet rays (UV).

The objective of the disinfection of the water is to reduce the concentration of undesirable micro-organisms such as viruses, fungi and parasites. Furthermore, one can carry out a chemical degradation of organic material to individual molecules, or chains of molecules, if required. However, it must be understood that a disinfection of the water can also be obtained in another way.

The water that is uppermost in the disinfection chamber 16 streams thereafter to the aeration chamber 20 by way of a perforated opening 19 in the aeration channel to the bio-filter chamber 27. In the bio-filter chamber 27 there is a bio-filter mass which takes up about 70% of the water volume in this chamber. In practice such a bio-filter mass is a series of particles, for example, small cubes of plastic, and where these are constructed to provide a large surface to volume ratio. The bacteria that are in these surfaces contribute to a conversion of ammonia to nitrite and nitrate (autotrophic degradation), and a conversion of organic molecules or molecule chains to $CO_2$ and water (heterotrophic degradation). At the bottom of this chamber 27, air, which gives a surplus of oxygen to the bacteria, is pumped in by way of an air-pump and pipe (not shown). Furthermore, a part of the produced $CO_2$ is removed with the excess air, and the air creates a movement in the water, which contributes in rendering the bio-filter mass effective.

At the end of the aeration chamber 20, the water flows on through a perforated opening 22 to bio-filter 27 where it is cleaned for dissolved organic matter and ammonia.

The water flows from the bio-filter 27 into the horizontal pipe 28 by way of a perforated pipe 23 and by way of a bend down into the vertical section 29, whereupon oxygen is added before the water flows out into the water in the main tank 1.

The pump unit 25, 26 will ensure that the water level V2 in the container 2 is higher than in the main tank 1. Thus, one ensures that the water will stream with a gravity-driven movement through the filter unit 12, disinfection chamber 16, the aeration chamber 20, bio-filter 27 and supply pipes 28 and 29 when it has been raised to the level V2. The water level V2 in the container 2 is preferably between 0.5 and 1.2 m higher that the water level V1 in the main tank 1.

Because the treatment unit 2 is in the main tank 1, the temperature of the water in the treatment unit will be the same as the water temperature in the main tank 1. Thereby, no rapid temperature gradients that can cause instabilities during the cleaning process are established.

The above-mentioned cycle is thereafter steadily repeated, whereby the water flows in a continuous loop from the main tank 1, to the treatment unit 2 and thereafter back to the main tank 1, so that the water is continuously treated. Some of the water in the main tank 1, preferably between 0.1% to 3% of the amount that flows through the treatment unit 1, is replaced by way of supply pipes, pump and exit pipes that are placed in the vertical wall 4 of the main tank and regulate the water level V1 in the main tank 1. By regulating the amount of water added, the temperature of the water in the main tank 1 can be controlled.

As mentioned, it must be understood that the process and means according to the invention can be used to farm marine organisms other than fish by suitably adapting the process to the specific demands to the water environment by the marine organisms. Thus, the supplied amounts of ozone, oxygen, pH-buffer, bio-filter mass or concentration of UV are not given, as this can be varied according to the demand.

The invention claimed is:

1. Means in farm installation for treatment of water that forms a growth environment for marine organisms, in which the water is in a main tank (1) that is placed on land, wherein a treatment unit (2) is arranged in the main tank (1), comprising devices for biological, chemical and physical treatment of the water, with the water from the main tank (1) being led by way of this treatment unit (2) for treatment and back to the main tank (1), characterised in that an aeration chamber (2) or exchange of gasses with the ambient air is arranged as an integral portion of the tank.

2. Means in accordance with claim 1, characterised in that the aeration chamber (20) is arranged on the outer periphery of the treatment unit (2), and that the longitudinal extension of the chamber (20) stretches along the upper wall section of the tank.

3. Means in accordance with claim 1, characterised in that one or more diffusers are arranged in the aeration chamber (20).

4. Means in accordance with claim 1, characterised in that pumping devices (25, 26) are arranged in the treatment unit (1) to feed water from a lower section of the water tank (1) by way of a pipe (9) to an upper section of the treatment unit (2), which is at a distance above the water level V1 in the main tank, so that the water is driven by gravitational force through the treatment devices in the treatment unit (2) and back to the main tank (1).

5. Means in accordance with claim 1, characterised in that a sieve (11) is fitted to the treatment unit (2) at the water inlet point of the pipe (9).

6. Means in accordance with claim 1, characterised in that the treatment unit (2) comprises a filter unit (12) for filtering the water of particles.

7. Means in accordance with claim 6, characterised in that the filter unit (12) comprises a grid-filter with a pore size of 90 μm.

8. Means in accordance with claim 1, characterised in that in a chamber (16) in the treatment unit (2), which is separated from the remaining part of the treatment unit (12) by a dividing wall (17), devices are arranged for disinfection of the water, with the water being led into a lower level of said chamber by way of a pipe (15), and where the water is led out of said chamber (16) to aeration chamber (20) by way of an opening in the part of the unit (2) that bounds the chamber (16).

9. Means in accordance with claim 8, characterised in that the disinfection takes place in that devices for supply of ozone are arranged in the chamber (16).

10. Means in accordance with claim 8, characterised in that devices for UV treatment of the water are arranged in the chamber (16).

11. Means in accordance with claim 1, characterised in that a chamber (27) is arranged in the treatment unit (2), preferably bound by a dividing wall (17), and that said chamber (27) functions as storage for biological treatment of the water.

12. Means in accordance with claim 10, characterised in that a biological filter is arranged in chamber (27).

13. Means in accordance with claim 12, characterised in that the biological filter comprises a large number of bodies with a large surface in relation to the volume, with the surfaces of said bodies functioning as adhesion surfaces for micro-organisms.

14. Process of treatment of water that forms a growth environment for marine organisms, in which the water is in a main tank (1) that is placed on land, wherein a treatment unit (2) is placed in a main tank (1), where the water from the main tank (1) is led by way of the treatment unit (2) and back to the main tank (1), for biological, chemical and physical treatment of the water, characterized in that the water is subjected to a gas exchange step when the water is led by gravitational forces through an aeration chamber 20.

15. Process in accordance with claim 14, characterised in that the process for treatment of the water comprises a stage in which the water goes through a mechanical filtration in the filter unit (12).

16. Process in accordance with claim 14, characterised in that the process for treatment of the water comprises a disinfection stage in the disinfection chamber (16).

17. Process in accordance with claim 16, characterised in that the disinfection takes place by adding ozone to the water in the disinfection chamber (16).

18. Process in accordance with claim 16, characterised in that the disinfection takes place by the water in the disinfection chamber (16) being subjected to UV radiation.

19. Process in accordance with claim 14, characterised in that the process for treatment of the water comprises a stage for biological treatment.

20. Process in accordance with claim 19, characterised in that the biological treatment comprises that on a set of surfaces, preferably arranged as a biological filter, a biological conversion of constituents in the water takes place with the help of micro-organisms.

21. Process in accordance with claim 20, characterised in that the biological conversion comprises conversion of ammonia to nitrite and nitrate (autotrophic degradation), and also a conversion of organic molecules or chain of molecules to $CO_2$ and water.

22. Process in accordance with claim 14, characterised in that the water is aerated in the aeration chamber (20).

23. Process in accordance with claim 14, characterised in that the process comprises the following stages:
   a) removal of particles
   b) disinfection
   c) aeration
   d) biological conversion, and
   e) supply of oxygen.

* * * * *